March 13, 1951     H. J. SIEKMANN ET AL     2,545,053
LATHE TRANSMISSION AND CONTROL MECHANISM
Filed Feb. 26, 1948     8 Sheets-Sheet 1

FIG. 1

*INVENTORS.*
*HAROLD J. SIEKMANN*
*GEORGE J. KASSELMANN*
BY

*ATTORNEYS.*

March 13, 1951     H. J. SIEKMANN ET AL     2,545,053
LATHE TRANSMISSION AND CONTROL MECHANISM Filed Feb. 26, 1948     8 Sheets-Sheet 2

INVENTORS.
HAROLD J. SIEKMANN
GEORGE J. KASSELMANN

ATTORNEYS.

INVENTORS.
HAROLD J. SIEKMANN
GEORGE J. KASSELMANN
BY
ATTORNEYS.

INVENTORS.
HAROLD J. SIEKMANN
GEORGE J. KASSELMANN
BY
ATTORNEYS.

March 13, 1951  H. J. SIEKMANN ET AL  2,545,053
LATHE TRANSMISSION AND CONTROL MECHANISM
Filed Feb. 26, 1948  8 Sheets-Sheet 8

INVENTORS.
HAROLD J. SIEKMANN
GEORGE J. KASSELMANN
BY
Toulmin & Toulmin
ATTORNEYS.

Patented Mar. 13, 1951

2,545,053

UNITED STATES PATENT OFFICE 2,545,053

LATHE TRANSMISSION AND CONTROL MECHANISM

Harold J. Siekmann and George J. Kasselmann, Cincinnati, Ohio, assignors to The R. K. Le Blond Machine Tool Company, Cincinnati, Ohio, a corporation of Delaware Application February 26, 1948, Serial No. 11,274

9 Claims. (Cl. 74—472)

This invention has to do with lathes and is concerned primarily with the transmission which delivers power to the spindle and certain control mechanism associated therewith.

In the patent to Groene No. 2,419,639, there is illustrated and described a tool room lathe having a transmission and associated control instrumentalities of the same general type as provided by this invention. However, this invention contemplates certain improvements over the machine of this patent.

In the Groene patent referred to, an electric motor is used as the main driving element. This motor is controlled by certain electronic devices so as to provide an infinite number of speed variations over the range of the motor. Moreover, provision is made for driving the spindle over its high range of speed by a direct belt drive from the motor. In addition, a back gear drive is provided which affords a gear reduction between the motor and the spindle. Either the direct belt drive or the back gear drive is used selectively, depending upon the character of the work which is being performed.

While a lathe which includes a transmission of the type aforesaid has met with a large degree of satisfaction, still it is felt that there is certain room for improvement. It is noted that the electronic devices for controlling the speed of the motor are so costly as to render their use impractical for installation under many circumstances. Furthermore, when the motor is operating under low speed in either the direct belt drive or the back gear drive, there is a marked falling off of the horsepower that is developed.

With the foregoing conditions in mind, the present invention has in view as an important objective the provision of a lathe of the type indicated which includes a variable speed direct current motor that is driven from a motor generator set. Thus the motor generator set and associated electrical instrumentalities take the place of the electronic devices heretofore used for this purpose with a material saving in cost resulting from the change.

Still another highly important object of the invention is the provision of a lathe of the character aforesaid which includes a transmission for transmitting power from the motor to the spindle and which transmission affords three speed ranges.

More in detail, the invention has as an object the provision in a lathe of a transmission including a direct belt drive for the high speed range, a high back gear drive for an intermediate speed range, and a low back gear drive for a low speed range. The variable speed motor is effective to afford a large number of speed variations over each range. The main advantage which is attributed to this arrangement is that the total part of the entire operating range in which the developed horsepower falls off is materially reduced.

In a lathe of the type with which this invention is concerned such as disclosed in the said Groene patent, provision is made for the cutting of coarse threads. When the lathe is so used, the transmission of power to the tool feed must include a comparatively high increase in the ratio at which the feed is driven. In the said patent, certain gear trains including shiftable elements are provided for this purpose. A further somewhat more detailed object of the invention is the provision of a lathe of the type indicated which includes a transmission following the above noted objectives and which transmission also includes a novel and improved arrangement for providing the high increase necessary in the delivery of power to the tool feed. The manner in which this object is achieved will become apparent from the specification.

In using a variable speed direct current motor in accordance with the above announced objects, it is, of course, necessary to combine a rheostat with the motor and this rheostat is adjustable so as to give the varying speeds. From the viewpoint of safety and preventing damage to the mechanism, it is desirable that any change in the effective transmission drive take place only when the rheostat is adjusted to a low speed. With this thought in mind, another object of this invention is the provision of an interlock which is effective to permit the gears to be shifted only when the rheostat has been adjusted to low speed. The manner in which this end is attained will also become apparent as the specification develops.

Not only is it necessary to provide a lathe which will include the various devices and mechanisms essential to following the above outlined objectives but it is equally important that indicating mechanism be provided which accurately informs the operator of the speed at which the spindle is rotated. Indicating mechanism of this general character is illustrated and described in the said Groene patent.

However, in view of the fact that this invention provides three ranges in the transmission rather than two, and further to the end of providing for accurate adjustment of the rheostat, certain novel dial mechanism is provided as an important part of the invention.

As there are three speed ranges provided for by the transmission, a dial of 360 degrees is divided into three sections of 120 degrees each, there being a section for each speed range. A gear shift lever is so connected to this dial by appropriate gearing that upon movement of the lever to effect a change in the driving ratio the dial is rotated to bring the corresponding dial section to the top which is the effective position.

Cooperating with this dial is a pointer or indicator mounted on a rotatable disc. This pointer is movable over an angular distance of 120 degrees so that it complements the particular dial section at the top to give an effective reading. Obviously, this dial or marker moves only through 120 degrees. However, it is important that the operating member which adjusts the rheostat be movable through a full 360 degrees so as to provide for accurate and not too rapid adjustment. Thus, a further object of the invention is the provision of operating connections between the rheostat and operating member and the pointer which provide for a 1 to 1 ratio between the operating member and the rheostat but a 1 to 3 ratio between the operating member and the pointer. This is accomplished by a gearing arrangement to be described in detail in the ensuing specification.

Various other more detailed objects and advantages of the invention such as arise in connection with carrying out the above noted ideas in a practical embodiment will in part become apparent and in part be hereinafter stated as the description of the invention proceeds.

The invention therefore comprises a lathe including a variable speed motor driven by a motor generator set and which in turn drives a spindle through any of the three drives provided by a novel transmission. Certain interlocks and indicating devices are associated with the transmission and included as a part of the invention.

For a full and more complete understanding of the invention, reference may be had to the following description and accompanying drawings wherein.

Referring now to the drawings wherein like reference characters denote corresponding parts, the manner in which the above outlined ideas are incorporated in a lathe will be described.

General arrangement

Figure 1:
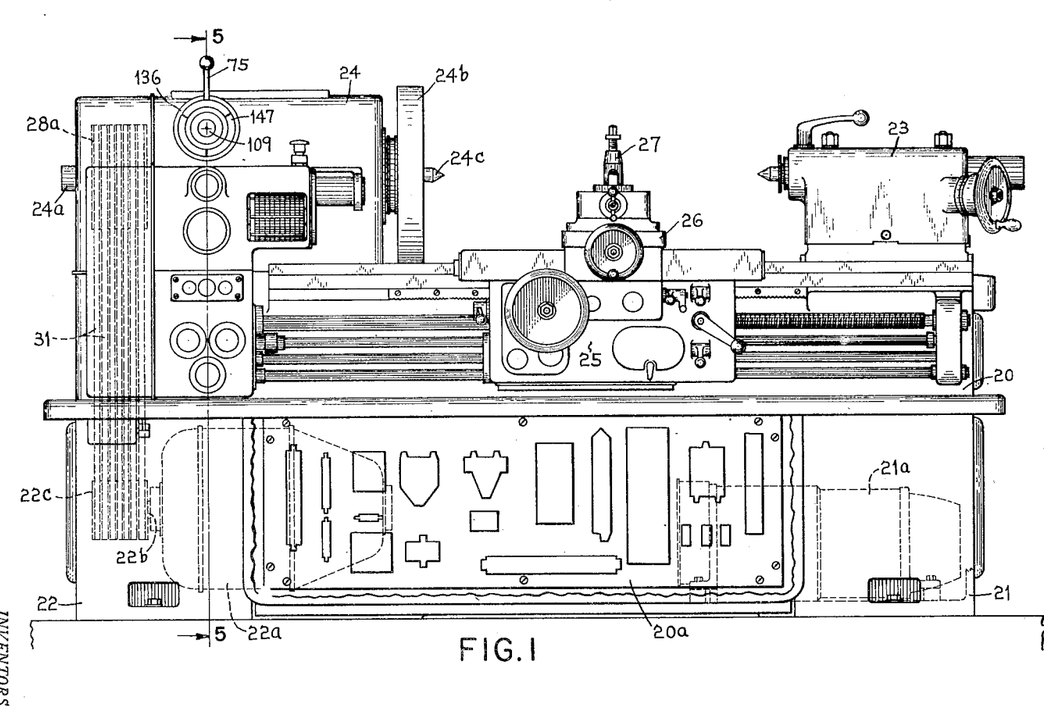
Figure 1 is a view in front elevation with parts broken away to show the arrangement of certain electrical instrumentalities of a lathe including transmission and control mechanism designed in accordance with the precepts of this invention.

Figure 1 illustrates a lathe which may be typical of the type to which the present invention is adapted. Such a lathe comprises a bed 20 which is supported by legs 21 and 22, the leg 21 being located at the tailstock end and the leg 22 at the headstock. Upstanding from the bed 20 is the tailstock which is referred to generally as 23 while from the opposite end upstands the headstock 24.

An apron 25 is shown as being positioned intermediate the headstock 24 and tailstock 23 and this apron carries a cross slide 26 which in turn carries a tool post represented at 27. The above noted elements are common to all lathes and are described purely for the purposes of indicating the environment of the present invention.

Below the bed 20 there is a motor generator set which is shown in broken lines in Figure 1 and which is designated 21a. The motor of this set is adapted to take current from an A. C. source of supply which is convenient to the lathe. As a practical matter, such a source of supply will most likely be a three phase, 60 cycle current under a voltage of either 220 or 440 volts as that is the type of current most commonly available around the places where lathes of this type are used. The motor of the unit 21a drives the generator which provides current for a main driving motor represented at 22a. This motor 22a is a variable speed direct current motor. The panel represented at 20a is shown as being adapted to carry various electrical devices which are used in conjunction with the unit 21a and motor 22a. The various elements and make up of the electrical equipment itself is not a part of the present invention because it is purchasable as such from any of the various manufacturers of electrical equipment of this type. The only thing with which the present invention is concerned is that the motor 22a may be adjusted to provide varying speeds in its output shaft and this is accomplished under an arrangement in which the voltage of the armature circuit is varied. However, the invention is not to be limited in this respect as the variable speed on the part of the motor 22a could be provided for in other ways. Moreover, the design of the motor 22a itself is not a part of this invention as it is purchased as such from a manufacturer of electrical equipment.

Figure 6:
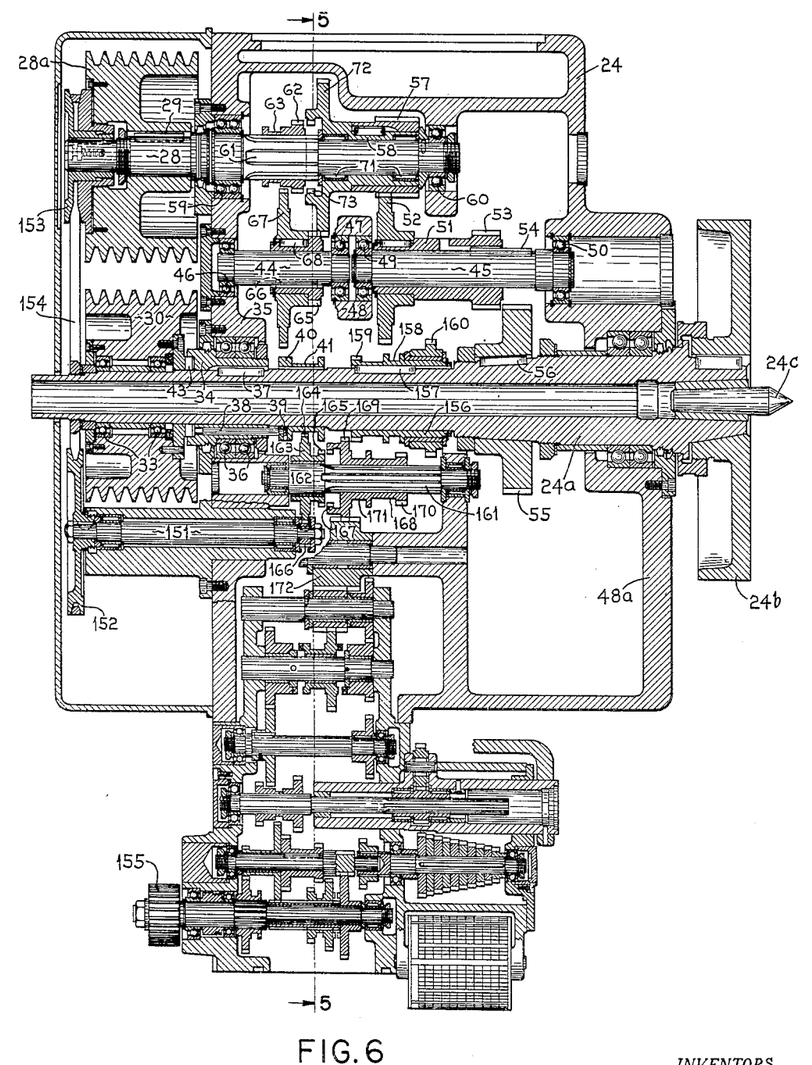
Figure 6 is a compound sectional view developing the various operating axes and is taken about on the planes represented by the lines 6—6 of Figure 5.

The center of the work spindle is shown at 24c in Figure 1 while the spindle itself is indicated at 24a in Figure 6. This spindle 24a carries the usual work fixture indicated at 24b and shown in both Figures 1 and 6. The motor 22a has an output or drive shaft 22b and the spindle 24a is driven from this shaft 22b. Upon referring to Figure 4 it will be noted that the motor shaft 22b drivably carries a pulley 22c, the driving relation being established by a key 22d. A back gear shaft 28 (see Figures 4 and 6) drivably carries a pulley 28a, the driving relation being established by the key shown at 29 and the spindle 24a carries a pulley 30 which in some conditions is journaled for free rotation about the spindle and in other conditions is clutched thereto. Belts 31 pass over the pulleys 22c, 28a, and 30 and guide roll 32 in the manner shown in Figure 4 and these belts serve to transmit the power for rotating the spindle 24a. This same setup also provides the power for operating the fine tool feed as will be later described.

*Transmission*

The transmission of this invention is intended to provide three speed ranges. The highest of these ranges is the direct belt drive from the motor shaft 22b to the spindle 24a and is accomplished by clutching the pulley 30 to the spindle 24a while the other gears are ineffective. The intermediate speed range is provided by the high back gear drive and the lowest range by the low back gear drive.

As shown in Figure 6, the pulley 30 is journaled on the spindle 24a by bearing assemblies 33. A clutch member 34 is journaled in a wall of the headstock such as represented at 35 by bearing assemblies 36. This clutch member 34 is keyed to the spindle 24a by the key shown at 37. The clutch member 34 carries a plurality of pins, one of which is shown at 38, and which pins are slidable in the clutch member in a direction parallel to the axis of the spindle. Each of the pins 38 has a head at 39 which provides for its connection to a shifting collar 40 that is slidable on the spindle 24a. The collar 40 has a groove 41 which receives the opposite ends of a shifting yoke that is shown at 42 in Figure 5. The ends of the pins 38 remote from the heads 39 take the form of points which are adapted to be received in openings formed in a plate 43 that is drivably carried by the pulley 30. Thus, when the pins 38 engage the openings in the plate 43 the driving relation between the pulley 30 and spindle 24a is established. On the other hand, when the pins are disengaged from these openings, the pulley 30 is free to rotate about the spindle.

Positioned between the back gear shaft 28 and the spindle 24a are a pair of aligned shafts 44 and 45. The shaft 44 has its outer end journaled in the wall 35 by a bearing assembly shown at 46. The inner end of the shaft 44 is journaled in a bearing 47 carried by a wall 48 formed in the headstock 24. The shaft 45 has its inner end journaled in a bearing 49 carried in the wall 48 and its outer end journaled in a bearing 50 carried by the wall 48a of the headstock 24.

A compound gear 51 carrying a gear 52 at one end and a pinion 53 at the other is slidable on the shaft 45 and is keyed thereto by the key shown at 54. In one position of the compound gear 51 the pinion 53 is adapted to mesh with a gear 55 that is keyed to the spindle 24a as shown at 56. The gear 52 meshes with a pinion 57 that is keyed to a sleeve 58 that is journaled on the back gear shaft 28. It is notable that this engagement of the gear 52 and pinion 57 takes place in all positions of the compound gear 51.

The back gear shaft 28 is journaled in the headstock wall 35 by the bearings shown at 59 and 60. A part of this shaft 28 is splined as shown at 61 and slidably mounted on this splined part is a gear 62. This gear 62 has an extension formed with a groove 63 which receives one end of a shifting arm that is shown in broken lines in Figure 5 at 64 and also in Figure 12. A pinion 65 is keyed to the shaft 44 as indicated at 66 and this pinion is slidable on the shaft. A gear 67 is in turn keyed to the pinion 65 as shown at 68 and is movable on the shaft 44. The unit comprising pinion and gear 67 is adapted to be shifted longitudinally on the shaft 44 by a shifting member shown at 69 in Figures 5 and 12. The member 69 is formed with a slot which receives the gear 67 and is carried at one end of an arm 70.

The sleeve 58 which, it will be recalled, is journaled on the back gear shaft 28, the bearings being shown at 71, carries at its forward end an external gear 72 and an internal gear 73. The internal gear 73 is adapted to mesh with the pinion 62 while the external gear 72 is adapted to mesh with the pinion 65.

Before describing the manner in which the shifting of the several gears is accomplished, it is noted that when the pinion 62 meshes with the internal gear 73 and the pinion 53 is engaged with the gear 55, the drive is from the pulley 28a through the shaft 28, gears 62 and 73, sleeve 58, pinion 57, gear 52 of the compound gear 51, pinion 53 and gear 55 to the spindle 24a. Under this condition, the pulley 30 is, of course, not clutched to the spindle 24a but merely journals freely thereabout. This is the intermediate range or high back gear speed.

In low back gear, the pinion 53 and gear 55 are still engaged but the gear 62 is shifted so that it engages the gear 67 rather than the internal gear 73. At the same time, the unit made up of pinion 65 and gear 67 is shifted so that the pinion 65 meshes with the gear 72. The drive is now from pulley 28a through shaft 28, gear 62, gear 67, pinion 65, gear 72, sleeve 58, pinion 57, gear 52 of the compound gear 51, pinion 53, and gear 55 to the spindle 24a.

*Shifting mechanism*

Figure 5:
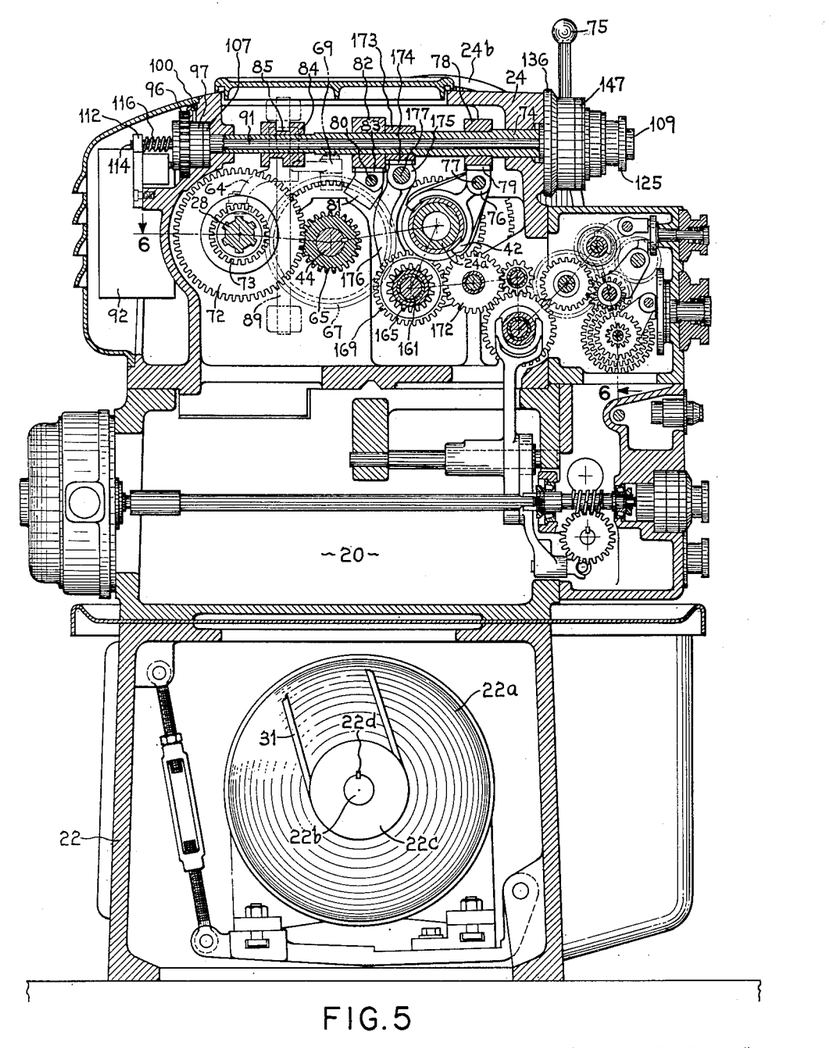
Figure 5 is another vertical section taken normal to the axis of the spindle and is taken about on the plane represented by the line 5—5 of Figures 1 and 6.

Upon referring to Figure 5 it will be noted that a sleeve 74 is journaled in the upper part of the headstock 24 in a direction transverse to the axis of the spindle 24a. A gear shift lever 75 is drivably connected to this sleeve in a manner to be later described. The important thing for the moment is that swinging of the lever causes rotation of the sleeve 74 to shift the gears and clutches so as to render any range desirable effective.

As above explained, the yoke 42 engages the groove 41 of the shift ring 40. This yoke 42 is carried by a sleeve 76 that is slidable on a rod 77 mounted below the sleeve 74 and in a direction transverse thereof. A ring 78 is drivably carried by the sleeve 74 and has gear teeth as indicated at 79 which engage complemental teeth on the sleeve 76. Thus, as the sleeve 74 is rotated the ring 78 is rotated and the engagement of the teeth 79 with the sleeve 76 causes the latter to slide along the rod 77 and impart a corresponding rectilineal movement to the yoke 42. This arrangement is quite similar to that described in the above identified Groene patent.

Slidable on a rod 80 that is positioned below the sleeve 74 and which extends in a direction transverse thereof is a shifting member 81 that is formed with a slot which receives the gear 52. A ring 82 is drivably mounted on the sleeve 74 and has teeth at 83 which engage complemental teeth on the member 81. Thus, as the sleeve 74 is rotated, the ring 82 is rotated and the teeth 83 cause the member 81 to slide along the rod 80. As the gear 52 is engaged by this member 81, a corresponding movement is imparted thereto.

Figure 12:
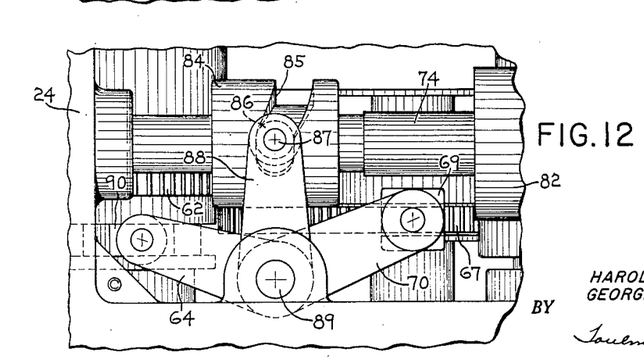
Figure 12 is a detailed plan view on an enlarged scale of a certain part of the gear shifting mechanism.

Referring now more particularly to Figure 12 which will be considered in conjunction with Figure 5, it will be noted that the sleeve 74 drivably carries a ring 84 which has formed in it a cam slot 85. A roller 86 is received in this cam slot 85 and is carried on a pin 87 which is in turn carried by an arm 88. The end of the arm 88 remote from the roller 86 is drivably connected to a vertically extending shaft 89. Thus, as the ring 84 is rotated, the cam slot 85 affects the roller 86 to cause a swinging of the arm 88 about the shaft 89 as an axis. It will be recalled that the arm 70 carries the member 69 which is formed with a slot that receives the gear 67. This arm 70 is also drivably connected to the shaft 89. The arm 64 is also drivably connected to the shaft 89 and at its free end carries a shoe 90 which is received in the groove 63. It is therefore evident that as the sleeve 74 is rotated the cam ring 84 and arm 88 impart a corresponding rotating motion to the vertical shaft 89. This causes a rocking of the arms 64 and 70 to move the gear 62 in one direction and the gear 67 in the opposite direction. Thus, when the gear 62 is moved into mesh with the internal gear 73, the unit made up of pinion 65 and gear 67 is moved in the opposite direction causing the pinion 65 to become entirely free and clear of the external gear 72. Then again, when the pinion 62 is shifted into engagement with the gear 67, the latter moves as a unit with the pinion 65 to cause the pinion 65 to mesh with the gear 72.

Control and indicating mechanism

It will be noted from Figure 5 that the sleeve 74 encloses a shaft 91. Both the sleeve 74 and shaft 91 extend substantially across the headstock at the top. The mechanism and arrangement at the rear of the headstock is shown in Figures 7 to 11, inclusive. Upon referring to Figure 7 it will be seen that a rheostat is represented at 92. It is this rheostat that controls the speed at which the motor 22a operates. Extending inwardly from the rheostat 92 is a control shaft 93. Drivably carried by the shaft 93 is a gear 94 with which meshes an idler gear 95. A second gear 96 meshes with the idler gear 95 and is drivably carried by the shaft 91. At this point, it is well to note that the gears 94 and 96 are of substantially the same diametrical dimensions so as to provide for a 1 to 1 ratio between the shaft 91 and rheostat control shaft 93. A disc 97 is formed with a central opening which receives a thimble 98 with the thimble in turn receiving the shaft 91. This disc 97 is held against rotation by a pin 99 which is screwed into the headstock framework 35 as indicated at 100. The end of the pin 99 is received in a notch shown at 101 in Figure 9.

Figure 9:
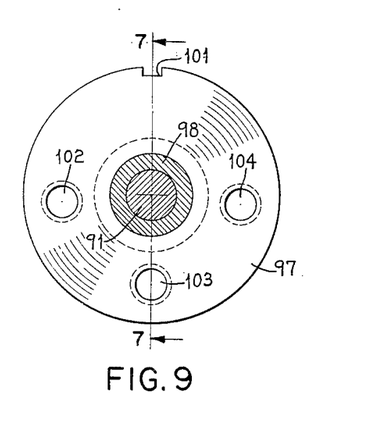
Figure 9 is another enlarged detailed sectional view taken about on the plane represented by the line 9—9 of Figure 7.
Figure 10:
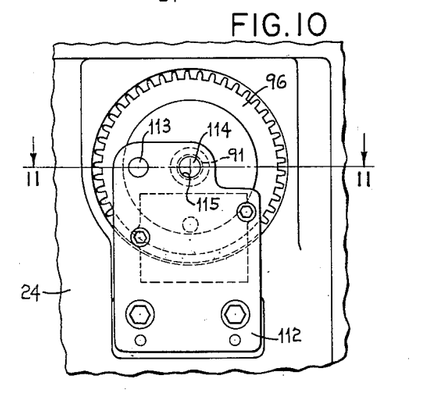
Figure 10 is a detailed view taken from the rear of the head with the casing removed and showing in detail a part of the interlock which prevents the gears being shifted until the rheostat is adjusted to low speed. This view is taken about on the plane represented by the line 10—10 of Figure 11.
Figure 11:
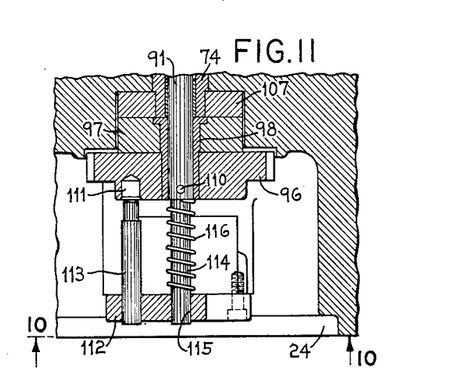
Figure 11 is a detailed horizontal section being taken about on the plane represented by the line 11—11 of Figure 10.

This disc 97 is formed with three openings 102, 103, and 104. Any of these openings is adapted to receive the head 105 of a pin 106 which is carried by a disc 107 that is keyed to the sleeve 74 as indicated at 108. It is evident that when the head 105 is received in any of the openings 102, 103, or 104, the sleeve 74 cannot be rotated. Thus, when this engagement is maintained there can be no shift in the transmission from one speed range to another. In order to permit such a change, it is necessary that the shaft 91 be moved laterally within the sleeve 74 so as to move the disc 97 away from the pin 105. This may be accomplished by the operator pressing against the button shown at 109 providing the rheostat 92 has been adjusted to low speed.

Figure 7:
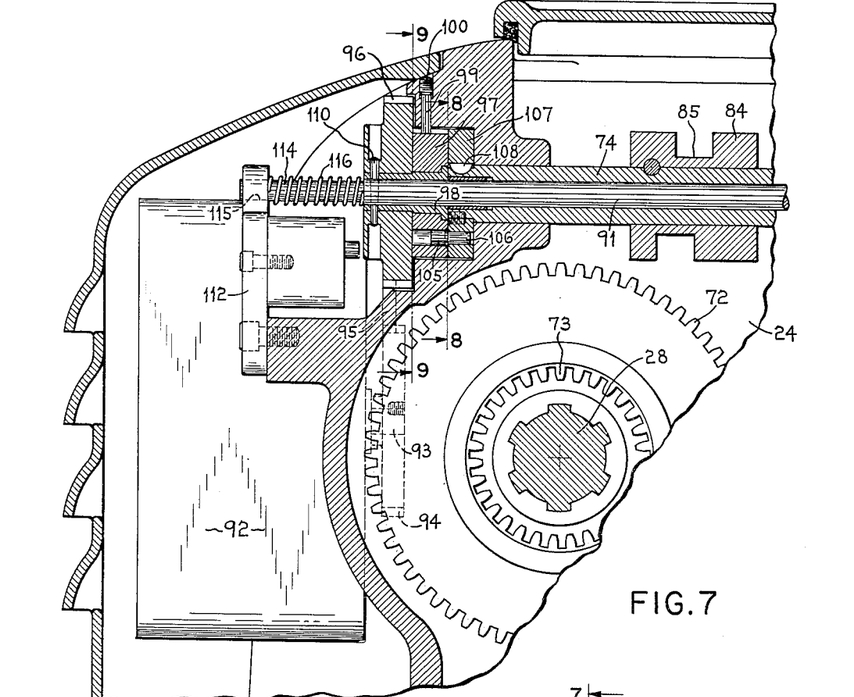
Figure 7 is an enlarged detailed view, partly in section and partly in elevation, of the connections between the control mechanism and the rheostat at the rear of the head. This view is taken about on the plane represented by the line 7—7 of Figures 8 and 9.
Figure 8:
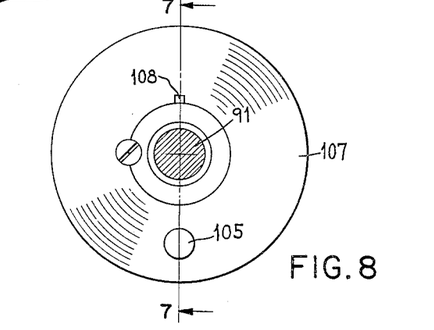
Figure 8 is an enlarged detailed sectional view taken about on the plane represented by the line 8—8 of Figure 7.

It will be noted that the gear 96 which is pinned to the thimble 98 and shaft 91 by the pin shown at 110 is formed with a socket 111. The framework 35 carries a panel 112 and extending inwardly from this panel is a pin 113, the free end of which is positioned in close proximity to the face of the gear 96. Thus the only position in which the shaft 91 and gear 96 which is carried thereby may be moved inwardly is when the pin 113 aligns with the socket 111. This condition of alignment obtains only when the rheostat 92 is adjusted to low speed as determined by the position of the gear 96.

It will be noted that the shaft 91 has a reduced end portion 114 and the end portion of the latter is slidably received in an opening 115 formed in the panel 112. An expansion coil spring 116 is disposed about this reduced portion 114 and bears against the larger part of the shaft 91 at one end and the panel 112 at the other. This spring normally urges the shaft 91 forwardly in the position depicted in Figure 7. However, it may be pressed rearwardly against the influence of this spring providing the pin 113 and socket 111 align. Briefly summing up the relation of the several interlock elements above described, it is noted that the gear shift lever 75 cannot be moved to shift gears unless the disc 97 is withdrawn from the head 105 of the pin 106. That is, there cannot be a shift in the gear ratio without first pressing against the button 109. But the latter operation is not possible of attainment until the rheostat 92 has been adjusted to low speed so as to cause the pin 113 and socket 111 to come into alignment.

Figure 13:
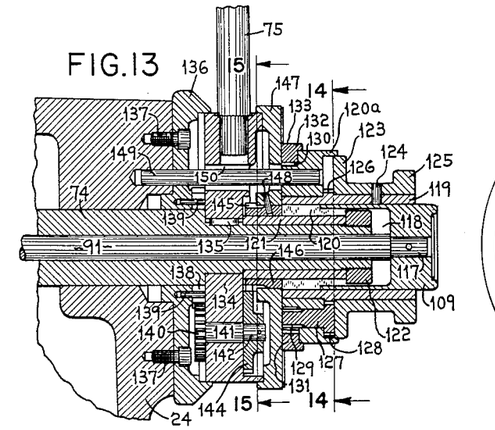
Figure 13 is an enlarged fragmentary sectional view taken on the line 13—13 of Figures 3, 14, and 15 showing the dial pointer and associated operating instrumentalities.

Referring now more particularly to Figure 13 it will be noted that the shaft 91 extends beyond the end of the sleeve 74 and is formed with a reduced portion 117 on which the button 109 is pinned and thereby drivably connected thereto. This button is formed with a cup-shaped recess 118 that receives the end of the sleeve 74 and accommodates relative movement between these parts. Drivably connected to the button 109 is a sleeve 119 having an inner portion that is counterbored to provide a thickened portion 120 that rotates about another sleeve 121 held in place by a nut 122 which is threaded on the end portion of the sleeve 74.

An operating member 123 is pinned to the sleeve 119 as shown at 124 and presents a knurled ring 125 for the convenient grip of the operator. The sleeve 120 is formed with external gear teeth 126 which provide in effect a gear that is drivably connected to the knurled operating ring 125. A stationary part which is connected to the headstock 24 and which is designated 120a carries a compound gear 127. One end of the compound gear 127 takes the form of a pinion 128 that meshes with the gear 126 while the other end takes the form of a pinion 129 that meshes with a reversing pinion 129a (see Figure 14) which in turn meshes with an internal ring gear 130 formed as a part of an indicating ring 131. The latter is formed with a lip 132 that overlies the stationary part 120a. At an appropriate point on the outer periphery of the ring 131, it is provided with a line or pointer designated 133.

Figure 14:
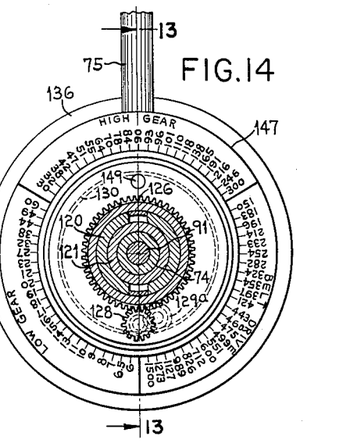
Figure 14 is an enlarged sectional view of the indicator mechanism being taken on the plane represented by the line 14—14 of Figure 13.
Figure 15:
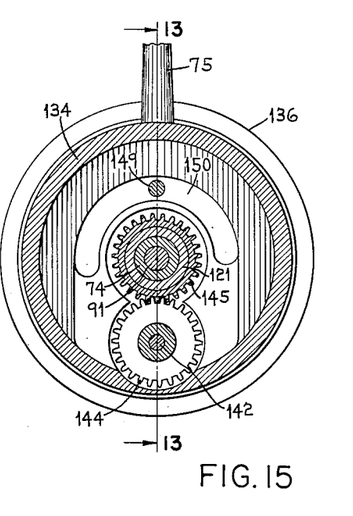
Figure 15 is an enlarged sectional view taken normal to the axis of the operating shaft and is taken about on the plane represented by the line 15—15 of Figure 13.

Thus, it is evident that as the ring 125 is rotated, the shaft is turned and the rheostat 92 adjusted with a 1 to 1 ratio obtaining between the control shaft 93 of the rheostat and the operating ring 125. However, due to the gear reduction provided by gears 126, 128, 129, 129a, and 130, the ring 131 is driven at a 1 to 3 ratio, that is, it only moves through one-third of the angular distance through which the ring 125 is turned. This will become important for a matter now to be described.

The gear shift handle 75 has a reduced end which is received in a socket formed in a ring 134. The latter is keyed to the sleeve 74 as shown at 135 so that as the handle 75 is swung the sleeve 74 is rotated. A circular plate 136 is anchored to the framework of the headstock by screw bolts shown at 137. A stationary gear 138 is in turn secured to the outer face of the plate 136 by pins shown at 139. Meshing with the gear 138 is a gear 140 that is formed integrally with a stud 141 which is journaled in the ring 134. This stud 141 has a reduced end 142 to which is drivably connected, as by a pin 143, a gear 144. The gear 144 meshes with another gear 145 that is carried on a sleeve 146.

A dial 147 is drivably connected to this sleeve 146 by the pins shown at 148. Thus, as the gear lever 75 is swung not only is the sleeve 74 rotated but through the gears 138 and 140, stud 141, gears 144 and 145, and sleeve 146 the indicating dial 147 is turned and the rate of rotation is stepped up by the gearing. Under practical conditions, the gear shift lever 75 is swung through only about 85 degrees from either side of the vertical position depicted in Figure 3. It is necessary that this amount of movement be effective to bring either of the three sections of the dial into the uppermost position, hence this stepped up gearing.

Figures 2, 3:
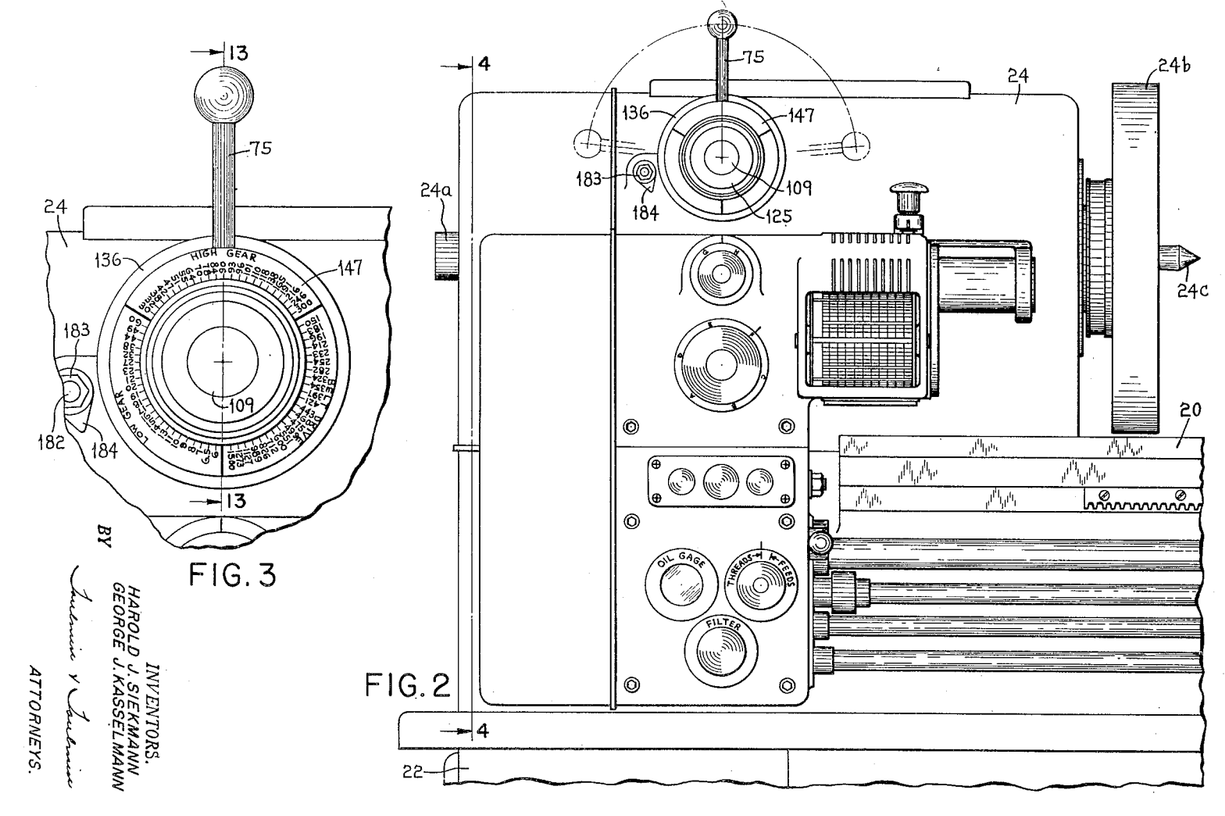
Figure 2 is a view in front elevation of the headstock and on an enlarged scale as compared to Figure 1.
Figure 3 is an enlarged detailed view of the gear shift lever and dial associated therewith.

Upon referring to Figure 3, it will be noted that the dial 147 is divided into three sections. One of these is designated belt drive and when the spindle 24a is driven directly from the belt 31 the section so designated should be in the uppermost position. The high gear position is shown at the top in Figure 3 and it is this section which cooperates with the pointer 133 when the high back gear ratio obtains. The low gear section is the lowest speed provided for and it is this section that should be at the top when the low back gear ratio obtains. It is evident that when the lever 75 is swung to accomplish the gear shift the dial 147 is correspondingly moved to bring the proper section of 120 degrees to the top or uppermost position in which it cooperates with the pointer 133.

It will be noted that the stationary part 120a is carried by a pin 149 that extends from the headstock 24 out through aligned slots 150 in the ring 134 and dial 147.

*Drive to tool feed for coarse thread cutting*

In order to provide for the proper drive to the tool feed depending on the nature of the work, three separate drives to the tool feed are included in the lathe. One of these is the drive for fine tool feed and is effective only when the transmission is adjusted for the high speed operation of the spindle that is established when the direct belt drive is effective. The second drive is for regular thread cutting and its operation may be established when the transmission is in either of the back gear drives. The third drive to the tool feed is for coarse thread cutting and may be established only when the transmission is adjusted to render the low back gear drive effective.

Figure 4:
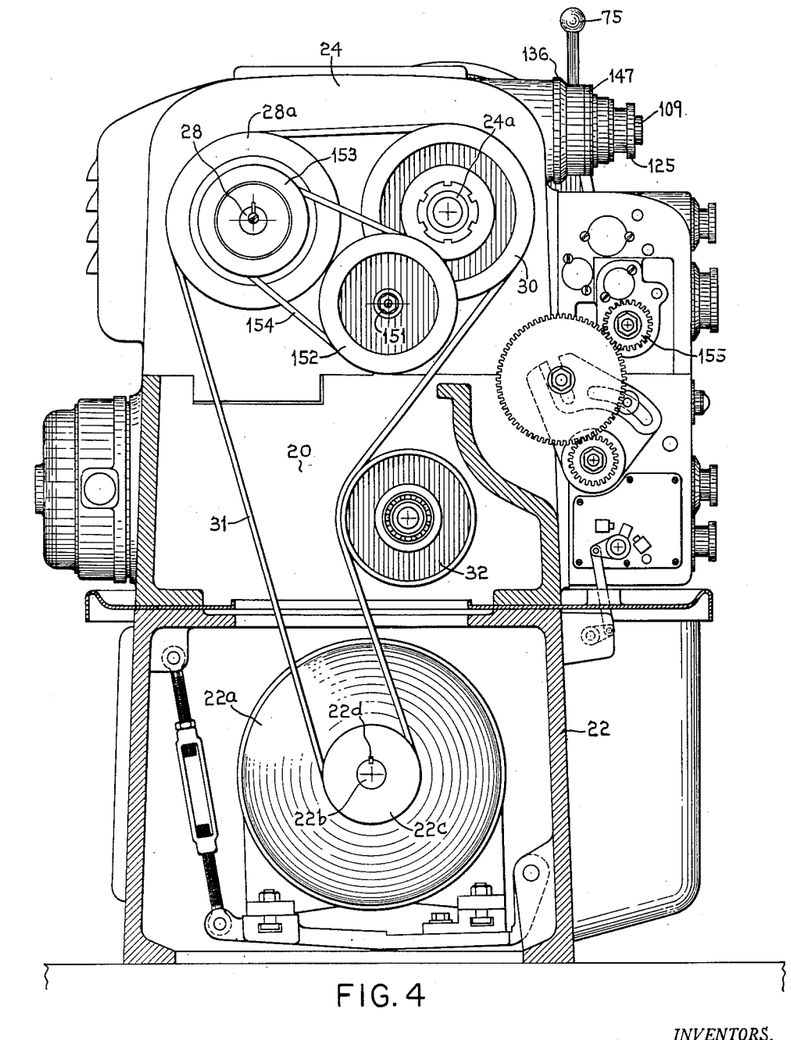
Figure 4 is a view taken as a vertical section normal to the spindle. This view is taken about on the plane represented by the line 4—4 of Figure 2.

Upon referring to Figure 4, it will be seen that a shaft 151 has drivably mounted thereon a pulley 152. Another pulley 153 is keyed to the back gear shaft 28. A belt 154 passes over the pulleys 152 and 153 and serves to drive the shaft 151. This shaft 151 is shown in Figure 6 and is effective to provide the fine tool feed in the manner described in the above identified Groene patent. Inasmuch as there is no change in this drive from the shaft 151 to the tool feed gear which is shown at 155, it is not thought necessary to here unduly lengthen this specification by repeating this descriptive matter. The Groene patent is referred to for the manner in which this is carried out. As above pointed out, this fine tool feed is effective only when the spindle 24a is in direct belt drive.

Certain gear mechanism is provided for establishing a drive from the spindle 24a to the tool feed and which drive may obtain when the transmission is in either of the back gear ratios. This gear mechanism also is adjustable to provide another drive for coarse thread cutting which is effective only when the transmission is in low back gear drive. This is accomplished by the mechanism now to be described. A sleeve 156 is keyed to the spindle 24a by the key shown at 157 and is slidable thereon due to the presence of the elongated keyway. This sleeve 156 is formed with a groove at 158 that receives a shifting member. One end of this sleeve 156 carries a gear 159 while the other end carries a gear 160.

A selector shaft 161 that is splined is shown as being journaled in a wall of the headstock. This shaft 161 includes a part at 162 that is free from splines and rotatably mounted on this portion 162 is a compound gear 163 providing a gear 164 and a smaller gear 165. The gear 164 meshes with a pinion 166 that is keyed to the shaft 151. The gear 165 is adapted to be either engaged or disengaged from an internal gear 167 that is formed on a sleeve 168. The latter is also formed with external gears 169 and 170. The sleeve 168 is also formed with a groove 171 which receives a shifting yoke at the end of an arm 176 which is actuated from the sleeve 74.

It is evident that when the sleeve 168 is shifted to the left, speaking with reference to the showing of Figure 6, the internal gear 167 and the gear 165 are engaged. At the same time, the gear 170 is disengaged from the gear 160 and the gears 159 and 160 are also out of mesh. The drive is therefore from the shaft 151 through pinion 166, gear 164, compound gear 163, gear 165, and internal gear 167, and gear 169 to the gear at 172 which may be taken as the start of the drive to the tool feed. This is the fine tool feed which is established when the spindle 24a is in direct belt drive.

When the sleeve 168 is shifted to the right, speaking with reference to the showing of Figure 6, two things take place. The internal gear 167 is disengaged from the gear 165, thereby breaking or interrupting the drive from the shaft 151. As the movement is continued, the gear 169 engages the gear 159, thereby driving the tool feed from the spindle 24a. This condition is intended for the cutting of regular threads and is effective when the transmission is in either of the back gear drives. Thus, when the spindle 24a is driven either at its intermediate speed which is established by the regular back gear or at its lowest speed which is established by low back gear, the spindle 24a is driven by gears 55, 53, and 52 and the spindle in turn drives the tool feed through gears 159 and 169 which latter gear meshes with the gear 172.

In establishing the drive to the tool feed for a coarse thread cutting, the sleeve 156 which carries a gear 160 is moved to the left, speaking with reference to the showing of Figure 6. It is to be remembered that this drive is to obtain only when the transmission is in low back gear for the spindle. In such a condition, the gear 52 will have been shifted to the right. Thus the gears 52 and 160 approach each other so as to bring them into mesh. The gear 160 idles on the sleeve 156 and is driven directly from the gear 52. This same movement which brings the gear 160 into mesh with the gear 52 also brings it into meshing engagement with the gear 170. The latter being integrally formed on the sleeve 168 drives the gear 169 which meshes with the gear 172 which is taken as the start of the tool feed.

It is evident that as the gear shift lever 75 is turned the sleeve 74 is turned and a ring 173 which is drivably carried thereby is rotated. This ring is formed with gear teeth at 174 that engage a sleeve 175 which carries the yoke 176. The sleeve 175 is slidable on a shaft 177. Thus, as the gear shift lever 75 is shifted, the yoke 176, which is received in the groove 171, shifts the sleeve 178 and gear elements carried thereby. Thus, whether the drive to the tool feed takes its power from the shaft 151 or the spindle 24a depends on the speed range which is effective. Thus, when the direct belt drive is effective, the drive to the tool feed is from the shaft 151 but when the back gear ratios are obtained it is from either the spindle 24a or the gear 52.

Figure 16:
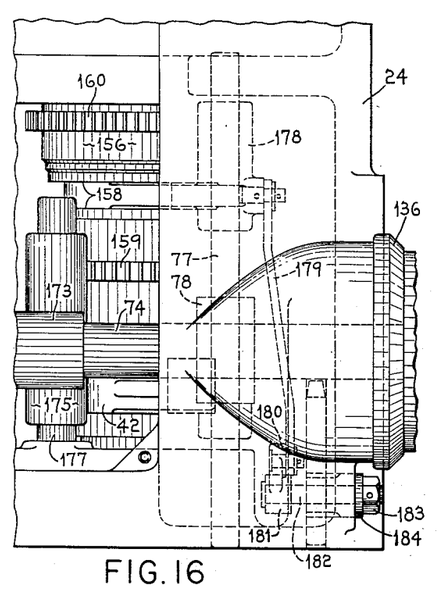
Figure 16 is an enlarged detailed plan view showing the shifting mechanism for changing the drive to the feed for coarse thread cutting.
Figure 17:
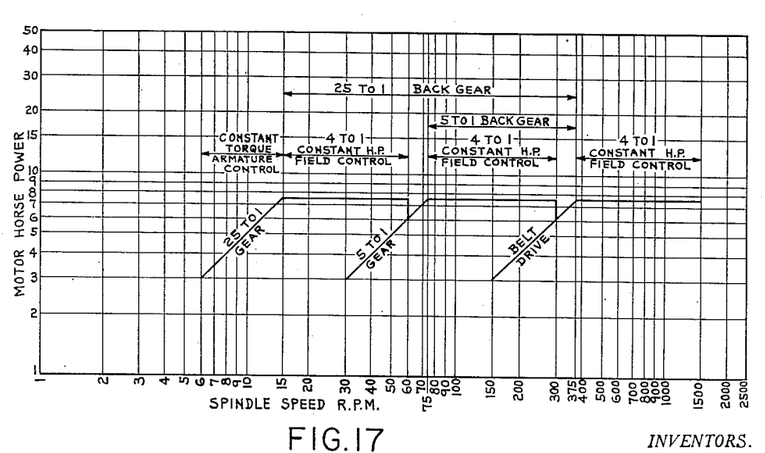
Figure 17 is a graphical illustration showing the power output over the operating range provided by the motor and transmission hereof.

In order to shift the sleeve 156 to vary the ratio in this drive from the spindle to the tool feed, the following mechanism is employed. Slidably positioned on the rod 77 is a sleeve 178 from which depends an arm carrying a yoke that engages the groove 158. Connected to this sleeve 178 is a link 179 which at its other end is connected to an arm 180 that extends from a hub member 181 that is keyed to a stub shaft 182. This stub shaft 182 is journaled in the framework and at its forward end carries a nut 183 and a pointer 184. When the adjustment is to be made for coarse thread cutting, a wrench is applied to the nut 183 to rotate the stub shaft 182. This swings the arm 180, which motion is transmitted through the link 179 to shift the sleeve 178 and yoke which is attached thereto. As the latter is positioned in the groove 158, the sleeve 156 is shifted.

Operational advantages

It is possible and entirely practical to obtain from the manufacturers of electric motors a variable speed direct current motor such as represented at 22a which will develop its basic horsepower over 75 percent of its range. This means that the horsepower falls off over the first 25 percent of the speed range. As the lathe is set up to operate at a minimum of 6 R. P. M., at this point 3 horsepower is developed. This horsepower gradually increases up to 15 R. P. M. whereupon the basic horsepower of the motor, which is 7½ horsepower, is developed and this condition obtains throughout the remainder of the range up to 60 R. P. M.

The foregoing conditions obtain when the low back gear drive is effective and causes a 25 to 1 gear reduction. When the shift to the high back gear drive is made, the gear ratio is changed to 5 to 1. There is a slight gap between 60 R. P. M. and the 75 R. P. M. provided by the high back gear at which the developed horsepower falls off slightly to a minimum of 6 horsepower but for all practical purposes this is taken care of by the motor which, under practical conditions, will develop sufficient excess horsepower to accommodate this gap. Thus, under conditions of actual usage, there is little, if any, falling off of the horsepower in bridging the change from low back gear speed to high back gear speed.

This speed range provides for revolutions of 60 R. P. M. to 300 R. P. M. When the change is made to the belt drive, the ratio is now 1 to 1 and the speed range is 300 to 1500 R. P. M. Again there is a small gap between 300 and 375 R. P. M. at which the horsepower may fall off slightly but for all practical purposes this is negligible.

It is therefore evident that with the mechanism above described it is possible to drive the spindle of the lathe over a speed range of from 15 R. P. M. to 1500 R. P. M. and develop substantially the basic horsepower of the motor over the entire range. There is a reduction in the horsepower from 6 R. P. M. to 15 R. P. M. and perhaps some slight reduction at the gaps indicated.

It is notable that when the direct belt drive to the spindle is effective, the gear 62 is out of engagement with both the gears 67 and 73. Thus, all of the gear mechanisms on the shafts 44 and 45 remain stationary and are not driven under an idling condition. This is a decided advantage as it eliminates the loss of any power and vibration which might attend such rotation.

In the shifting of the gears in the transmission to the spindle, the gears which engage and disengage move toward and away from each other rather than having all the motion take place in a single gear. Thus, the gear 62 moves into and out of engagement with the gear 67 but the latter also moves towards and away from the gear 62, this action being provided for by the arms 64, 70, and 88. Furthermore, the provision of the sleeve 156 and gears 159 and 160 which are carried thereby provide for two ratios in the drive to the gear 172 which is taken as the start of the tool feed. Thus, by shifting the sleeve 156 so that the gear 160 engages the gear 52 a low drive is provided for coarse thread cutting.

Further definite advantages are presented by the interlock mechanism. It is impossible to shift the gears without first depressing the button 109 to shift the shaft 91 but this latter action cannot take place until the rheostat 92 has been adjusted to low speed.

By providing for a gear reduction between the operating ring 125 and the pointer 133, it is possible to maintain a 1 to 1 ratio between the ring 125 and the rheostat control shaft 93 and yet have the pointer 133 move over an entire range of only 120 degrees. Furthermore, by providing the step up gearing between the gear shift lever 75 and the dial 147 movement of the gear shift lever is restricted to about 85 degrees to each side of the vertical position illustrated while the dial is rotated sufficiently far to bring the correct section to the uppermost position where it cooperates with the pointer 133 to indicate the speed at which the spindle is being driven.

While a preferred specific embodiment of the invention is hereinbefore set forth, it is to be clearly understood that the invention is not to be limited to the exact mechanism, devices, apparatus, speeds, and horsepower illustrated and described because various modifications of these details may be provided in putting the invention into practice within the purview of the appended claims.

What is claimed is:

1. In a lathe including a work spindle to be driven and a variable speed direct current motor as a power source, a transmission for driving said spindle from said motor under different conditions of mechanical advantage, said transmission comprising a pulley freely journaled on said spindle, a clutch operable to drivably connect said pulley to said spindle, a back gear shaft, a pulley drivably carried by said back gear shaft, a gear drivably and slidably mounted on said back gear shaft, a compound gear freely journaled on said back gear shaft and including a gear element adapted to be engaged by said sliding gear, a gear train providing a predetermined gear ratio and adapted to be connected between said sliding gear and said spindle, a second gear train of a different ratio adapted to be operatively connected between said compound gear and said spindle, a drive shaft included as a part of said motor, a pulley drivably carried by said drive shaft, and a drive belt passing over all said pulleys.

2. In a lathe including a work spindle to be driven and a variable speed direct current motor as a power source, a transmission for driving said spindle from said motor under different conditions of mechanical advantage, said transmission comprising a pulley freely journaled on said spindle, a clutch operable to drivably connect said pulley to said spindle, clutch operating means for establishing or disestablishing the driving relation, a back gear shaft, a pulley drivably carried by said back gear shaft, a gear drivably and slidably mounted on said gear shaft, means for shifting said gear, a compound gear freely journaled on said gear shaft and including a gear element adapted to be engaged by said sliding gear, a gear train providing a predetermined gear ratio and adapted to be connected between said sliding gear and said spindle, a second gear train of a different ratio adapted to be operatively connected between said compound gear and said spindle, a drive shaft included as a part of said motor, a pulley drivably carried by said drive shaft, a drive belt passing over all said pulleys, and mechanism for interrelating the operations of said clutch operating means and said gear shifting means.

3. In a lathe including a work spindle to be driven and a variable speed direct current motor as a power source; a transmission for driving said spindle from said motor under different conditions of mechanical advantage, said transmission comprising a pulley freely journaled on said spindle; a clutch operable to drivably connect said pulley to said spindle; a back gear shaft; a pulley drivably carried by said back gear shaft; a gear drivably and slidably mounted on said back gear shaft; a compound gear freely journaled on said back gear shaft and including an internal gear adapted to be engaged by said sliding gear, an external gear, and a pinion of smaller diameter than said external gear; a pair of aligned counter shafts; a compound gear on one of said counter shafts and including a gear adapted to mesh with said sliding gear, and a pinion adapted to mesh with said external gear of the first said compound gear; and another compound gear on the other of said counter shafts, said last mentioned compound gear having a gear slidably engaging the pinion of the first said compound gear, and a pinion that is adapted to be drivably connected to said spindle; a drive shaft included as a part of said motor; a pulley carried by said drive shaft; and a belt passing over all of said pulleys.

4. In a lathe including a work spindle to be driven and a variable speed direct current motor as a power source, a transmission for driving said spindle from said motor under different conditions of mechanical advantage, said transmission comprising a pulley freely journaled on said spindle; a clutch operable to drivably connect said pulley to said spindle; clutch operating means; a back gear shaft; a pulley drivably carried by said back gear shaft; a gear drivably and slidably mounted on said back gear shaft; means for shifting said gear; a compound gear freely journaled on said back gear shaft and including an internal gear adapted to be engaged by said sliding gear, an external gear, and a pinion of smaller diameter than said external gear; a pair of aligned counter shafts; a compound gear on one of said counter shafts and including a gear adapted to mesh with said sliding gear, and a pinion adapted to mesh with said external gear of the first said compound gear; means for shifting said last mentioned compound gear on said countershaft; and another compound gear on the other of said counter shafts, said last mentioned compound gear having a gear slidably engaging the pinion of the first said compound gear and a pinion that is adapted to be drivably connected to said spindle; gear shifting means for shifting the last said compound gear; a drive shaft included as a part of said motor, a pulley carried by said drive shaft; a belt passing over all of said pulleys; and mechanism for interrelating the operations of said clutch operating and all said gear shifting means.

5. In a lathe including a variable speed motor, a rheostat associated with said motor to control the speed thereof, and a change gear transmission adapted to provide different speed ranges in the transmission of power from said motor, a sleeve rotatably mounted and operatively connected to said transmission to cause a shifting of the gears thereof upon rotation of said sleeve, a shaft enclosed by said sleeve and longitudinally movable and rotatable therein, releasable means for locking said sleeve in an angular position of adjustment, said releasable means being connected to said shaft to be released upon longitudinal movement thereof, operative connections between said shaft and said rheostat whereby rotation of said shaft adjusts said rheostat, and an interlock for permitting longitudinal movement of said shaft only when it is in a position that adjusts said rheostat for the low speed operation of said motor.

6. In a lathe including a variable speed motor, a rheostat associated with said motor to control the speed thereof, and a change gear transmission adapted to provide different speed ranges in the transmission of power from said motor, a sleeve rotatably mounted and operatively connected to said transmission to cause a shifting of the gears thereof upon rotation of said sleeve, a gear shift lever radially outstanding from said sleeve, a shaft enclosed by said sleeve and longitudinally movable and rotatable therein, releasable means for locking said sleeve in an angular position of adjustment, said releasable means being connected to said shaft to be released upon longitudinal movement thereof, spring means normally urging said shaft in one direction, a knob at one end of said shaft adapted to move it in the other direction against the influence of said spring means, operative connections between said shaft and said rheostat whereby rotation of said shaft adjusts said rheostat, an operating member drivably connected to said shaft for rotation thereof, and an interlock for permitting longitudinal movement of said shaft only when it is in a position that adjusts said rheostat for the low speed operation of said motor.

7. In a lathe including a work spindle and a drive for a tool feed, mechanism selectively operable to operate said tool feed drive from said spindle and comprising a first compound gear slidably and drivably mounted on said spindle and including a pair of gear elements of different diameters, a countershaft mounted substantially parallel to said spindle, a second compound gear slidably and drivably mounted on said countershaft comprising a gear element on said second compound gear operatively connected to said tool feed drive and a second gear element on said second compound gear of smaller diameter, and means for shifting both of said compound gears to engage said gear elements to provide two different operating gear ratios between said spindle and said tool feed drive.

8. In a lathe including a work spindle and a drive for a tool feed, mechanism selectively operable to operate said tool feed drive from said spindle and comprising a first compound gear slidably and drivably mounted on said spindle and including a pair of gear elements of different diameters, means for shifting said gear longitudinally on said spindle, a countershaft mounted substantially parallel to said spindle, a second compound gear slidably and drivably mounted on said countershaft comprising a gear element on said second compound gear operatively connected to said tool feed drive and a second gear element on said second compound gear of smaller diameter, and means for shifting both of said compound gears to engage said gear elements to provide two different operating gear ratios between said spindle and said tool feed drive including one shifting means for shifting the second of said compound gears on said countershaft, and another shifting means interacting with said one shifting means to shift the first compound gear on said spindle.

9. In a lathe including a work spindle and a drive for a tool feed, mechanism selectively operable to operate said tool feed drive from said spindle and comprising a compound gear slidably keyed to said spindle and including a pinion at one end and a gear of larger diameter than said pinion at the other end, a splined countershaft arranged substantially parallel to said spindle, a second compound gear including a gear at the end corresponding to the pinion on the first compound gear and adapted to mesh therewith, a pinion on the other end of said second compound gear adapted to mesh with the gear on the first said compound gear, the gear on said second compound gear being operatively connected to said tool feed drive, and an internal gear at one end thereof, a third compound gear freely journaled on said countershaft and including an externally toothed pinion adapted to mesh with said internal gear, and a gear element drivably connected to a source of power other than said spindle, and means for shifting the second said compound gear to cause it to take power either from said spindle or the third said compound gear.

HAROLD J. SIEKMANN.
GEORGE J. KASSELMANN.

REFERENCES CITED

The following references are of record in the file of this patent:

UNITED STATES PATENTS

| Number | Name | Date |
| --- | --- | --- |
| 2,156,596 | Lloyd | May 2, 1939 |
| 2,197,893 | Le Blond | Apr. 23, 1940 |
| 2,221,574 | Chladek | Nov. 12, 1940 |
| 2,332,381 | Hollscher | Oct. 19, 1943 |
| 2,387,417 | Sundt | Oct. 24, 1945 |
| 2,419,639 | Groene | Apr. 29, 1947 |